United States Patent [19]
McGowan et al.

[11] Patent Number: 6,077,605
[45] Date of Patent: Jun. 20, 2000

[54] SILICATE COATINGS AND USES THEREOF

[75] Inventors: Nancy M. McGowan, Sturgeon; Robert L. Heimann; William M. Dalton, both of Moberly, all of Mo.

[73] Assignee: Elisha Technologies Co LLC, Moberly, Mo.

[21] Appl. No.: 09/016,850

[22] Filed: Jan. 30, 1998

Related U.S. Application Data

[60] Provisional application No. 60/036,692, Jan. 31, 1997.

[51] Int. Cl.[7] .............................. C09K 3/00; B32B 15/18
[52] U.S. Cl. ...................... 428/389; 428/375; 428/379; 428/383; 428/391; 428/367; 428/457; 252/389.62
[58] Field of Search ..................... 428/379, 391, 428/367, 457, 383, 389; 252/389.62

[56] References Cited

U.S. PATENT DOCUMENTS

| | | |
|---|---|---|
| 4,395,810 | 8/1983 | Tsuzawa et al. . |
| 4,806,357 | 2/1989 | Garrett et al. . |
| 5,080,925 | 1/1992 | Kouno . |
| 5,164,003 | 11/1992 | Bosco et al. . |
| 5,254,358 | 10/1993 | Kouno et al. . |
| 5,330,794 | 7/1994 | Bosco et al. . |
| 5,421,882 | 6/1995 | Kouno et al. . |
| 5,516,816 | 5/1996 | Samuels . |
| 5,632,819 | 5/1997 | Geissler . |
| 5,658,465 | 8/1997 | Nicholas et al. . |
| 5,658,841 | 8/1997 | Tanaka et al. . |
| 5,714,093 | 2/1998 | Heimann et al. ................... 252/389.62 |
| 5,725,662 | 3/1998 | Nakatsukasa et al. . |
| 5,725,663 | 3/1998 | Parrette . |
| 5,728,217 | 3/1998 | Kohno et al. . |
| 5,728,218 | 3/1998 | Kohno et al. . |
| 5,739,081 | 4/1998 | Lloyd et al. . |
| 5,871,668 | 2/1999 | Heimann et al. ................... 252/389.62 |

OTHER PUBLICATIONS

Application of Digital Signal Processing in Diagnois of Noise Problems During Braking—Alex C. Lee (Delphi Chassis Systems), David C. Sheridan (Delphi Chassis Systems).

*Primary Examiner*—William Krynski
*Assistant Examiner*—J. M. Gray
*Attorney, Agent, or Firm*—Michael K. Boyer

[57] ABSTRACT

The disclosure relates to silica and/or silicate containing coatings upon particles, fibers, powders, among other substrates. The solubility of the coating can be modified by being treated with a metal chloride.

14 Claims, 2 Drawing Sheets

SILICATE COATINGS AND USES THEREOF

The subject matter herein claims benefit under 35 U.S.C. 111(a), 35 U.S.C. 119(e) and 35 U.S.C. 120 of Provisional Patent Application Ser. No. 60/036,692, filed on Jan. 31, 1997; both of which are entitled "Silicate Coatings and Uses Thereof". The disclosure of the aforementioned Provisional Patent Application is hereby incorporated by reference.

FIELD OF THE INVENTION

The subject matter of the instant invention relates to silica and/or silicate containing coatings upon particles, fibers, powders, among other substrates.

BACKGROUND OF THE INVENTION

The corrosion of steel and other metal containing products continues to be a serious technical problem that has profound effects on the economy. Corrosion causes loss of natural resources, and deteriorates key infrastructure such as roads and buildings. It also causes premature replacement of equipment and parts in industrial facilities, boats and other marine vehicles, automobiles, aircraft, among a wide range of metallic components.

Current industry standards for corrosion prevention center around the use of barrier coatings, sacrificial coatings, alloys containing heavy metals such as chromium, nickel, lead, cadmium, copper, mercury, barium, among other heavy metals. The introduction of these materials into the environment, however, can lead to serious health consequences as well as substantial costs to remediate environmental contamination. Damage associated with corrosion, accordingly, is a continuing problem and better systems for preventing corrosion are still needed.

Corrosion associated with an automotive braking system is known to produce a disturbing noise as is discussed in "Application of Digital Signal Processing in Signal Diagnosis of Noise Problems During Braking" by Alex C. Lee and David C. Sheridan, presented Jun. 3, 1993 at the International Symposium on Automotive Technology and Automation (ISATA), Florence, Italy. A method for improving corrosion of metal fibers within automotive frictional members is described in "Ceramic Coated Steel Fibers: A Potential Solution For Corrosion And Improvements Of Properties Uniformity", presented on Oct. 14, 1991 to the SAE and Brake Colloquium General Committee.

Compositions and methods for applying coatings are described in "Pharmaceutical Pelletization Technology", by Ghebre-Sellassie (1989); "Pharmaceutical Dosage Forms: Tablets", by S. Porter et al., vol. 3 (1989); and "Modern Pharmaceutics" by C. Rhodes et al. (1996).

The disclosure of the previously identified publications is hereby incorporated by reference.

SUMMARY OF THE INVENTION

The instant invention solves problems associated with conventional practice by providing a silica and/or silicate containing coating upon a substrate. Such a coating imparts improved admixture characteristics, adhesion to a surrounding matrix, e.g., phenolic resin or metal, controlled dissolution, resistance to corrosion and oxidation such as crevice corrosion between two or more metal articles in contact, thermal properties, among other desired properties.

The subject matter of the instant invention relates to silica and/or silicate containing coatings upon particles, fibers, powders, among other substrates. For is example, the instant invention can apply at least one sodium silicate containing coating upon a particulate composition and, thereafter, render the applied coating substantially insoluble by applying one or more coatings of an acidic metal containing salt, e.g., zinc chloride; or a soluble metal compound, e.g. ammonium zirconyl carbonate. While a wide range of coatings can be applied in accordance with the invention, a sodium zinc silicate containing layer is particularly useful in imparting improved resistance to acids, water, among other corrosive agents.

In one aspect of the invention, a silica and/or silicate containing layer is applied upon, for example, carbon fibers. The silicate layer can be applied via any suitable process such as spray drying, immersion, among other suitable methods. The silicate coated carbon fiber can be employed in wide range of applications including as a fiber reinforcement within a metal matrix composite, e.g., the coated fiber is embedded within a surrounding metal matrix comprising aluminum, magnesium, alloys thereof, among others. That is, the silicate coating upon the carbon fiber reduces fiber pull-out from the matrix thereby improving the physical characteristics of the composite. If desired, the surrounding matrix can comprise a plastic, phenolic resin, among other suitable materials, e.g, fiber reinforced plastics and carbon-carbon composites. When the surrounding matrix comprises a phenolic resin, a silicate-coated steel fiber can be embedded in the matrix for producing an automotive brake pad having improved corrosion resistance.

In another aspect of the invention, a silica and/or silicate containing layer is applied upon a powder or particle. The silicate coating can be employed for tailoring the chemical and physical characteristics of the powder or particle. The coating can impart resistance to acids or moisture. Such resistance can permit controlled delivery or release of pharmaceuticals, fertilizers, herbicides, among other powder or particulate materials. For example, vitamin, protein or peptide powders that are coated with silica and/or silicate become resistant to acids thereby allowing the underlying powders to survive stomach acids, and in turn be digested in the intestines. Additionally, coatings applied to seeds can control germination rates, e.g., the coatings can affect that rate at which moisture permeates through the coating and contacts the underlying seed. The seed coating can also include nutrients and beneficial bacteria.

CROSS-REFERENCE TO RELATED PATENTS AND PATENT APPLICATIONS

Figure 1A:
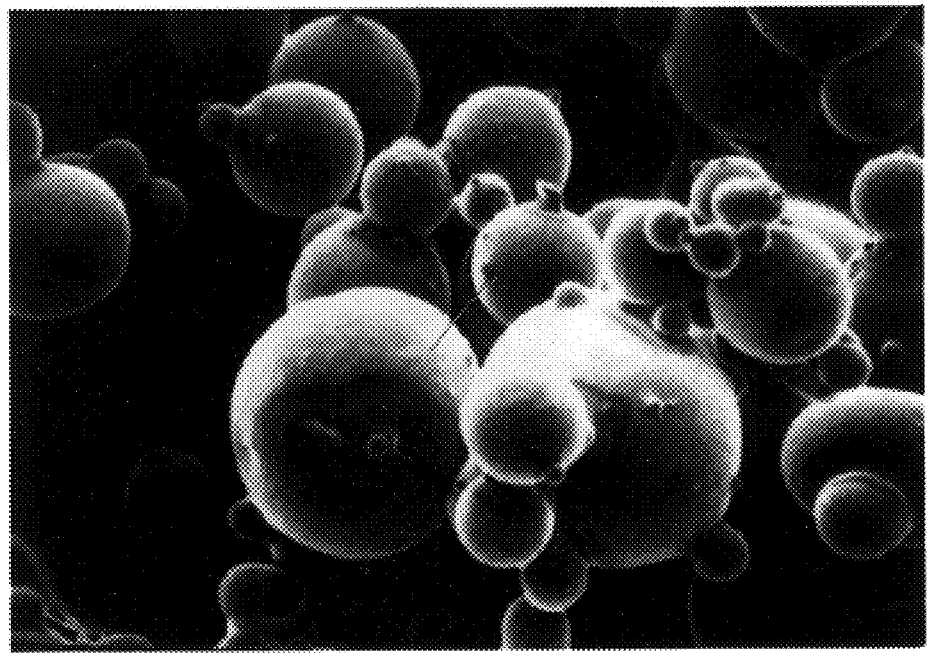
FIGS. 1A and B are scanning electron microphotographs taken, respectively, at 450× and 1260× magnification of uncoated sodium silicate particles.

The subject matter of the instant invention is related to copending and commonly assigned Non-Provisional U.S. patent application Ser. No. 09/016,853, pending (Attorney Docket No. EL001RH-8 filed on even date herewith) in the names of Robert L. Heimann et al., as a continuation in part of Ser. Nos. 08/850,323 and 08/850,586 both pending, (Attorney Docket No. EL001RH-6 and 7) that are continuation in parts of Ser. Nos. 08/791,337, now U.S. Pat. No. 5,938,976, and 08/791,336, now U.S. Pat. No. 5,928,796 (Attorney Docket Nos. EL001RH-4 and 5) that are in turn continuation in parts of Ser. No. 08/634,215 (filed on Apr. 18, 1996) in the names of Robert L. Heimann et al., and entitled "Corrosion Resistant Buffer System for Metal Products", which is a continuation in part of Non-Provisional U.S. patent application Ser. No. 08/476,271 (filed on Jun. 7, 1995), abandoned, in the names of Heimann et al., and corresponding to WIPO Patent Application Publication No. WO 96/12770, which in turn is a continuation in part of Non-Provisional U.S. patent application Ser. No. 08/327,438 (filed on Oct. 21, 1994), now U.S Pat. No. 5,714,093.

The subject matter of this application is also related to Non-Provisional Patent Application Ser. No. 09/016,849, pending (Attorney Docket No. EL004RH-1), filed on even date herewith and entitled "Corrosion Protective Coatings".

The disclosure of the previously identified patent and patent applications and is hereby incorporated by reference.

DETAILED DESCRIPTION

The subject matter of the instant invention relates to silica and/or silicate containing coatings upon particles, fibers, powders, among other substrates. Normally, the substrates will range in size from about 1 micron to about 0.25 inches (may be spherical, irregular, or rod-like in shape). The coating can be tailored to have a wide range of thickness; but typically ranges from about 1 micron to about 25 micron thick. While a wide range of coatings can be applied in accordance with the invention, a sodium zinc silicate containing layer is particularly useful in imparting improved resistance to acids, water, among other corrosive agents.

While any suitable substrate can be coated in accordance with the instant invention, examples of such substrates include particulate materials such as an alkali silicate, thermoplastics such as nylon; commercially available fibers such as Kevlar fibers (supplied by the DuPont Company), carbon fibers, catalysts, steel fibers, fertilizers, herbicides, pesticides, protective coatings upon fruits and seeds, pharmaceuticals such as proteins, peptides, among other substrates. One example of a suitable silicate containing coating comprises sodium silicate supplied by PQ Corporation as N Grade sodium silicate solution. The dimensions of the substrate are dependent upon the method for applying the coating. When spray drying is employed, the dimensions of the substrate must accommodate the spray drying apparatus, e.g., in most cases, the dimensions of the substrate are smaller than the diameter of the spray orifice. Normally, the largest diameter of the substrate will be less than about 0.25 inches.

The following are controllable process parameters for applying the inventive coating in a conventional spray drying apparatus, e.g, a Model GCGP-5supplied by Glatt of Ramsey, N.J. The parameters are described for example in "Factors to Consider in Fluid-Bed Processing" in Pharmaceutical Technology, April 1995 by David M. Jones; hereby incorporated by reference. The specific parameters can be predetermined by one skilled in this art who has understood the instant description.
1. Processing Time: about 15 minutes to about 8 hours
2. Inlet Air Temperature in to the drying apparatus:(about 10 C. to about 100° C. but usually about 25° to about 60° C.)
3. Outlet Air Temperature—same range as above, but usually lower than.
4. Product Temperature: about 10C. to about 100° C.; but usually about 25° to about 50° C.
5. Outlet Flap of the spray apparatus: 0–100%; but usually 50–100%.
6. Flow Rate-Air Volume through the spray apparatus: greater than about 0 to about 250 cfm; but usually about 100 to about 250 cfm.
7. Coating Solution Flow Rate: greater than about 0 to about 10 grams per minute; normally about 7.5.
8. Total Amount of Solution Applied: Can vary depending upon the amount and characteristics of the substrate particles.
9. Inlet Air Humidity: about 10 to about 100% RH; usually about 25 to about 50 RH.
10. Atomization Air Pressure: 3.0 bar.
11. Pressure Drop (A) Chamber/(B) Filter: (A) about 110 to about 270 MM $H_2O$/(B) about 5 to about 250 MM $H_2O$.

After obtaining a suitable spray drying apparatus and determining the appropriate process parameters, the substrate particles are introduced into the apparatus and, thereafter, are fluidized or lifted into the spray coating zone. The fluidization characteristics of the particles are determined by bulk density, particle density, and size and shape of the particle. The quantity of air, steam, or other gas sufficient to achieve fluidization varies depending upon the batch size of the substrate. The aforementioned parameters that are related to fluidization include items 5., 6., 12 as well as nozzle geometry (7" Wurster) & Distribution Plate ("HS"). The pressure drop referred to in item 11 allows particles to fallback down into the coating zone thereby allowing additional coating to be deposited onto the particle. That is, the particle is entrained in the rising gas stream, pulled out of the coating zone allowing the coating to dry. This cycle continues until the particle becomes too heavy to become fluidized or until the machine is turned off.

After the substrate, for example, particles are successfully fluidized, a coating solution is introduced into the spray apparatus. If the solution is not sufficiently atomized, the substrate particles will contact a relatively large amount of liquid thereby causing the particles to adhere to each other as well as to the end up sticking to the spray apparatus walls. Key parameters for successfully atomizing the coating solution include aforementioned items 7., 10., the location and number of atomizing nozzles, atomizer apperature inside diameter, coating solution viscosity, solution % solids, and solution interfacial tension. Atomized droplet size, temperature differences, and time duration of particles in the coating zone can also be regulated by the aforementioned parameters.

Once the coating solution is atomized, a coating can be applied onto the fluidized particles. One manner for effectively coating application, is to operate the spray drying apparatus under conditions such that the substrate particle has a slightly lower temperature, e.g., about 5 to about 10° C., than the inlet air temperature. This temperature difference induces the atomized droplets of liquefied silicate coating to condense onto the substrate particles.

The coated particle is then dried. For best results, drying occurs before the particle contacts the apparatus wall, or becomes agglomerated with other particles. The rate of drying can affect the characteristics and/or structure of the dried coating, e.g., improper drying can cause the coating to flake off from the underlying substrate. The rate of drying is affected by the aforementioned parameters 2., 4., 6., 9., 11. The rate of drying is also determined by the amount of water or solvent (% solids of the atomized solution).

In some cases it is desirable to produce the silica/silicate coating in an environment that is substantially free of oxygen. By "substantially free", it is meant that there is less than about 1% oxygen present when forming the coating. This environment can be created by any suitable means such as a nitrogen (or other inert gas) blanket, vacuum (for non-fluidization processes), among other means. The use of expensive gases is typically more practical for small coating units which require smaller gas volumes to achieve fluidization.

In one aspect of the invention, a silica and/or silicate containing layer is applied upon, for example, carbon fibers. The silicate layer can be applied via any suitable process such as spray drying, immersion, among other suitable methods. The silicate coated carbon fiber can be employed in wide range of applications including as a fiber reinforcement within a metal matrix composite, e.g., the coated fiber is embedded within a surrounding metal matrix comprising aluminum, magnesium, alloys thereof, among others. That is, the silicate coating upon the carbon fiber reduces fiber pull-out from the matrix thereby improving the physical characteristics of the composite. The inventive coating can also improve the high temperature resistance of the resultant composite. The silica/silicate coating can also be applied upon a steel fiber that is in turn embedded within a phenolic resin matrix. The fiber reinforced resin can be molded or shaped into a brake pad for use in automotive applications. Such a pad has improved corrosion resistance and reduced sound generation in comparison to conventional brake pads. We do not have any thickness data, just visual SEM confirmation of complete coating. The coating is sodium silicate. Maximum concentration is determined by atomizing characteristics of spray nozzle.

In another aspect of the invention, a silica and/or silicate containing layer is applied upon a powder or particle. The silicate coating can be employed for tailoring the chemical and physical characteristics of the powder or particle that is made up entirely or in part of beneficial chemicals. The coating can impart resistance to acids or moisture. Such resistance can permit controlled delivery or release of pharmaceuticals, fertilizers, seeds, herbicides, among other powder or particulate materials. For example, vitamin, protein or peptide powders that are coated with silica and/or silicate become resistant to acids thereby allowing the underlying powders to survive stomach acids, and in turn be digested in the intestines. That is, the silica and/or silicate containing layer is resistant to a pH of about 1.4 to about 4 which corresponds to the pH of the stomach. The relatively high pH of the intestines, e.g., about 4 to about 7, can permit that silica/silicate coated material to dissolve thereby enabling the material to contact and be digested by the intestines. In addition to silica/silicate, the coating can include minerals, vitamins, among other medicaments.

In a further aspect of the invention, one or more intermediate coatings or layers are located between the outer silica/silicate coating and the underlying substrate. The intermediate coating can also be employed in an alternating fashion with silica/silicate coatings. Normally, the intermediate coating is employed to permit controlled or delayed activation of the underlying substrate. For example, an intermediate layer comprising an effervescent material can be employed for causing the outer coating to release upon exposure to a predetermined amount of a permeating species. That is, a permeating species migrates through the outer layer and contacts the effervescent material. The effervescent material expands thereby removing the outer layer and permitting the substrate to become active. For example, a grain seed is coated with an intermediate material and in turn with a sodium silicate containing layer in order to delay germination of the seed (thereby allowing corn to be planted in the fall while harvesting wheat). Water permeates through the sodium silicate layer which causes a sodium bicarbonate intermediate layer to expand and remove the outer silicate layer, and in turn permit seed germination. The effervescent material can be applied in any suitable method such as in a non-aqueous binder. Examples of effervescent materials comprise at least one member selected from the group consisting of sodium carbonate, sodium bicarbonate, ammonium salts such as ammonium silicate, calcium carbide, mixtures thereof, among others. Under normal conditions the permeating species comprises water.

If desired, the solubility of the silica/silicate coating can be reduced by applying one or more secondary coatings containing a metal salt, e.g., a heavy metal salt such as zinc chloride, aluminum chloride, mixtures thereof, among others (20 wt % zinc chloride solution). The solubility of the silica/silicate coating can also be modified, e.g., reduced, by being contacted with a weak or mild acid, e.g., dilute solution of sulfuric or hydrochloric acid. Further, the secondary coating can involve treating the silica/silicate coated material with at least one of an organotitanate, borate, organozirconate, mixtures thereof, among others. Normally, the coating composition comprises an aqueous sodium silicate solution or a liquid or polymeric binder filled with fumed silica/powdered silicate particles. If desired, alternating layers of a soluable and insoluablized silicate layer can be provided a mechanism. The aforementioned secondary coatings and treatments can be applied by any suitable method such as rinsing with aqueous or solvent borne solutions, which contain the treatment, and drying or spray coating (for example within a conventional spray drying apparatus).

A coupling agent can be used for treating the substrate before as well as after being coated with the inventive silica/silicate coating. The coupling agent is employed as a processing aid, acid resistance, anti-static, moisture resistance, corrosion resistance, and for enhancing compatibility with polymers and solvents. Examples of suitable coupling agents comprise silanes, titanate, zirconate, aluminate coupling agents. The coupling agent can be applied by spray coating, washing, tumbling, prilling (also known as perforated pan coating), among others. Normally, the amount of coupling agent corresponds to about 0.01 to about 2 wt.% of the coated substrate.

While any suitable apparatus can be employed for applying the inventive coating, desirable results can be achieved by using a commercially available spray drying or vapor coating apparatus, e.g., a model GPCG 5 supplied by Glatt Air Techniques, Inc., Ramsey, N.J. While any suitable conventional spray drying method such as side spray agglomerating/coating, fluid bed drying, top spray coating, fluid bed agglomerating, perforated pan coating, bottom spray (wurster) coating, among others, can be employed; best results have been obtained by using bottom spray (wurster) coating and side spray agglomerating/coating methods.

The silica/silicate coating can be applied to a wide range of substrates such as particles, powders, flakes, beads, spheres, fibers, pellets, tablets, agglomerates, and the like by utilizing fluidized bed or non-fluidized bed equipment. Fluid bed spray driers, coaters, agglomerators, and granulators can be fixtured with a bottom spray (including Wurster), side spray, top spray or a combination of these depending upon the previously identified parameters. The liquid coating can be atomized using one or more atomizing spray nozzles or rotating disk atomizers. Fluidized bed tangential spray granulators or coaters can also be utilized. The equipment can employ co-current, countercurrent, or mixed flow of the drying gas (normally heated dry air). Non-fluidized bed equipment likewise can be utilized to apply coating and include but are not limited to verticle drying columns and pneumatic conveyer driers with diameters sufficient to keep wet particles and the like away from the vessel walls and height or length sufficient to acheive the desired level of drying. In such arrangements, the particles may fall through regions of atomized coating material or be entrained with the drying gas to be transported through regions of atomized coating material.

While the above description has placed particular emphasis upon coating sodium zinc silicate upon sodium silicate particles, the instant invention can be employed for applying a virtually unlimited number of coatings upon a wide range of substrates. If desired the substrate can be coated with one or more coatings of chemically similar or distinct materials. The coated substrate can also be treated further in order to modify at least the surface of the outer most layer, e.g., the coated substrate can be contacted with a metal salt such as a zinc chloride containing solution in order for adding zinc as well as reducing the solubility of the outer silicate coating. The coated substrates can be employed or as in intermediate product, e.g., as an additive to a composite.

Moreover, the silica/silicate coating can also include any desirable liquid or polymeric materials; provided they are compatible with the other constituents of the composition and substrate. For example, silica/silicate particulates or powder could be dry blended with plastic, rubber, or other polymeric coating materials that are typically used for melt granulation or coating (Sandvik Rotocoat(®) process). In this application, the granulation or coating material is melted in a rotary turbine as they are tumbled with the substrate pellets or objects to be coated.

The following Example is provide to illustrate certain aspects of the instant invention and not to affect the scope of the invention as defined in the appended claims.

EXAMPLE 1

This Example was performed on a commercially available Glatt GPCG-5 spray coater fitted with a 7" Wurster fluidizing attachment, a DW screen, and a "HS" air distribution plate. The apparatus had a 310–023 filter which was automatically shaken every 30 seconds for a duration of 3 seconds.

The coating spray nozzle was the Schlick 970 series nozzle with a 0.8 mm port size and oriented as a bottom spray coater in a flush angle position. The atomizing air pressure was set to 3.0 bar. The inlet air had a wet bulb temperature of 10.8 C. and a dry bulb temperature of 15.5 C. and was then heated initially to 45 C. The air flow volume was initially ramped up to 150 cfm. The substrate to be coated consisted of G sodium silicate powder (supplied by PQ Corp.) and the batch size was 4.1 kg. The coating solution was a 94.4% by weight solution of N grade sodium silicate liquid (also supplied by PQ Corp.) in distilled water.

The coating process lasted a total of 388 minutes over which time 2.876 kg of coating solution was applied at a flow rate of 7.5 grams per minute. The temperature of the G sodium silicate was ramped up to approximately 36 C. initially and gradually rose to approximately 42 C., increasing with the increased air flow volume. The warm up stage lasted the first 7 minutes at which time the coating stage was started. At 15 minutes the fluidizing air volume flow rate was increased to 150 cfm. At 18 minutes, the atomization pressure was increased to 4 bar. At 71 minutes the fluidizing air volume flow rate was increased to approximately 230 cfm and then adjusted to approximately 250 cfm at 141 minutes. After 217 minutes, the inlet air temperature was raised to approximately 50 C. The spraying was discontinued at 383 minutes and the process was ended at 388 minutes. Periodic particle size estimation utilizing an 80 mesh screen indicated that the particles were being coated as the process continued. The % yield was approximately 93%, the remainder being lost during sampling, handling, or through the filter. A particle size analysis indicated that 88% of the material passed through a 70 mesh screen and 12% passed through a 170 mesh screen. The silicate coated product had a poured bulk density of 0.56 grams per cubic centimeter.

Figure 1B:
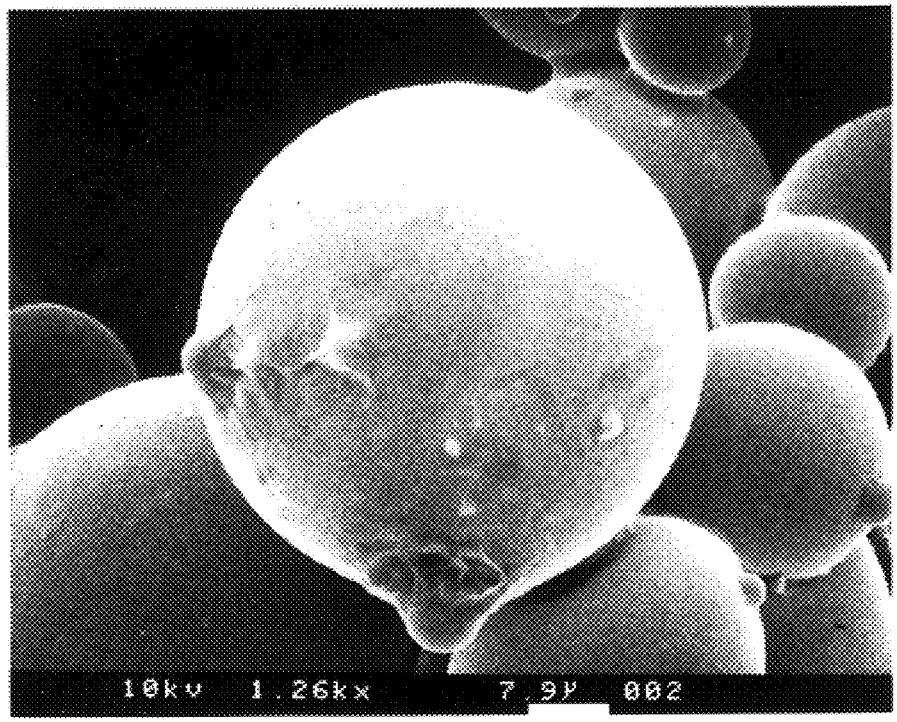
Figure 2A:
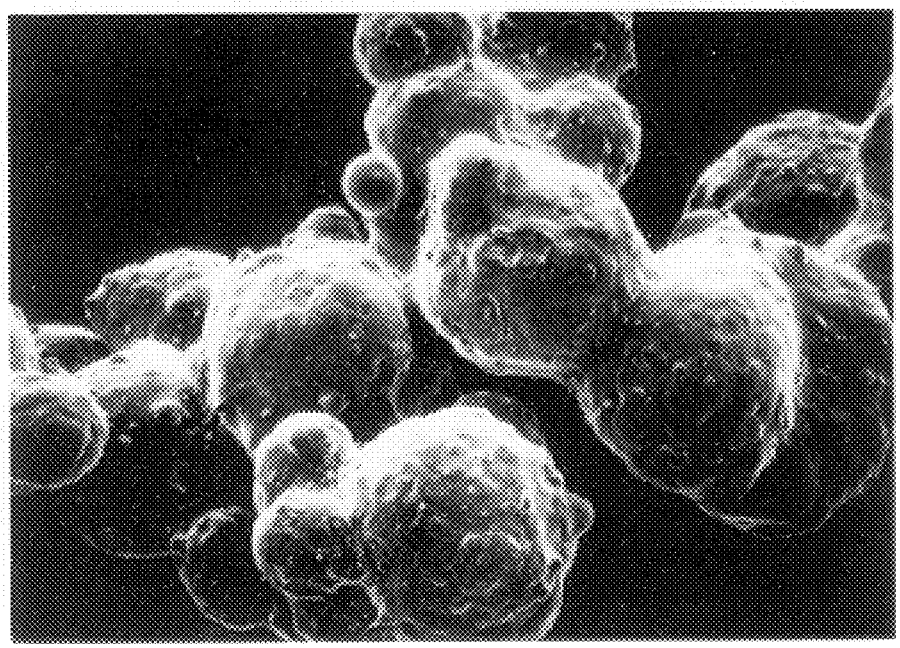
FIGS. 2A and B are scanning electron microphotographs taken, respectively, at 450× and 1260× magnification of sodium silicate particles coated with a sodium zinc silicate containing layer.
Figure 2B:
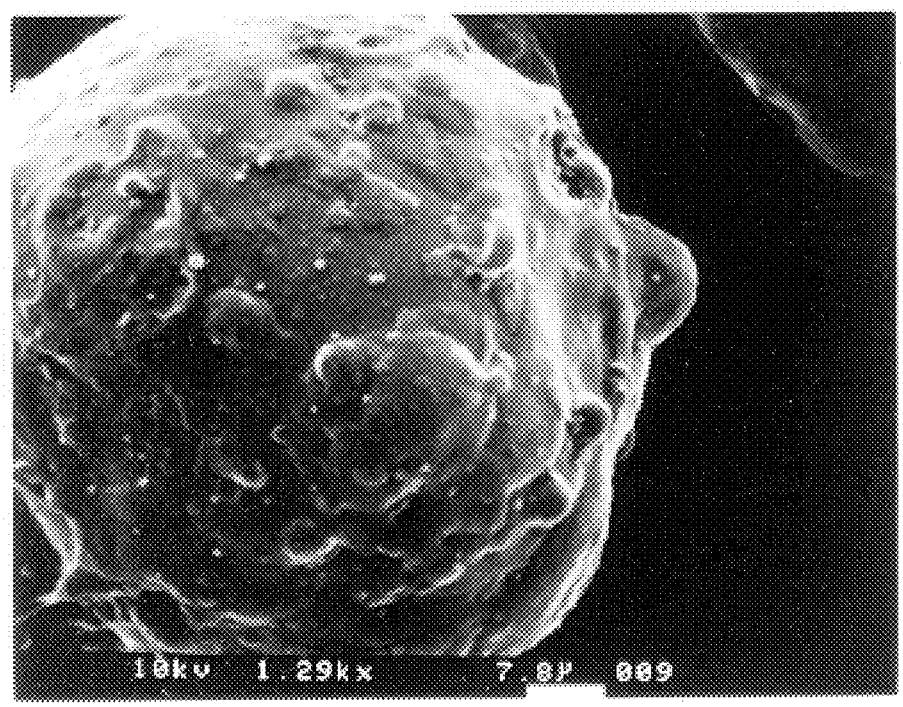

At the conclusion of the previously described process, SEM inspection of the particle verified the particles had been coated. Referring now to the drawings, FIGS. 1A and 1B correspond to FIGS. 1A and B are scanning electron microphotographs taken, respectively, at 450× and 1260× magnification of uncoated sodium silicate particles. FIGS. 2A and B are scanning electron microphotographs taken, respectively, at 450× and 1260× magnification of the sodium silicate particles shown in FIGS. 1A and 1B which illustrate the silicate particles have been coated.

EXAMPLE 2

This example illustrates a process for coating steel fibers in a commercially available Glatt GPCG-5 by utilizing a fluid bed.

The product bowl of the spray coater was charged with 4.5 kg of "D" steel fibers standard friction material steel fibers supplied by Delco-Moraigne. The coating supply vessel was charged with 900 g liquid sodium silicate (supplied from P.Q. as "N" grade sodium silicate) diluted with 75 g of distilled water. The preliminary settings for the Glatt GPCG-5 spray drying apparatus with a 2.2 liter product bowl were as follows:

A. Port size 0.8 mm
B. Filter no. 510–016
C. Set inlet temperature @ 65° C.
D. Outlet temperature @ 32° C.
E. Product temperature 42.5° C.
F. Outlet flap setting, 38% of full open
G. Fluid flow rate setting 40 g/min
H. Air volume 300 CFM The following experimental matrix delineates fiber type, coupling agent pre-treat and coupling agent post-treat that were coated with a silicate containing coating. The amount of a coupling agent, indicated below, were diluted to 500 MLS in 2-propanol with the exception of Sample I1 that was diluted with ethanol.

1. Note "A" fibers are from American Metal Fibers (Type FM-5ZE) usually less than 0.1 inch long, some round, flat, bent, straight.
2. "D" type fibers are from Delco.

| Number Experimental Run/Lot # | Fiber Type | Pre-Treat Coupling Agent | Silicates | Post-Treat Coupling Agent |
|---|---|---|---|---|
| A1 | D | No | Yes | No |
| B1 | D | 40 grams Silane CPS076S | No | No |
| C1 | A | 22.5 grams Silane CA0700S | Yes | No |
| D1 | D | 22.5 grams Silane CA0700S | Yes | 22.5 grams Silane CA700S |
| E1 | A | 11 grams Titanate | Yes | 11 grams LICA 97 |

-continued

| Number Experimental Run/Lot # | Fiber Type | Pre-Treat Coupling Agent | Silicates | Post-Treat Coupling Agent |
|---|---|---|---|---|
| F1 | D | LICA97 35 grams Silane CPS076S | Yes | 21 grams Silane CPS076S |
| G1 | D | 14 grams Zirconate NZ-37 | Yes | 14 grams Zirconate NZ-37 |
| H1 | A | No | 2xYes | No |
| I1 | A | No | 2xYes | 21 grams Silane CAO700S |

Silane CPS076S (n-trimethoxysilylpropyl)-polyethylenimine (Huls, Bristol, Pa.)
Silane CA0700S N-(2-aminoethyl-3-aminiopropyl) trimethoxysilane (Huls, Bristol, Pa.)
Titanate Lica 97 titanium IV 2,2 (bis 2-propanylatomethyl) butanolato-tris(3-amino) phenylato (Kenrich, Bayonne, N.J.)
Zirconate NZ-37 zirconium IV bis 2,2 (bis 2-propenylatomethyl)butanolato, bis(paraaminobenzaoto-O) (Kenrich, Bayonne, N.J.)

3. Run Conditions—Same as the preliminary machine settings except outlet temperature varied during the runs by 37° C. to 42° C., product temperature varied from 41° C.–49° C., flow rate averaged 40 g/pm with a range from 34 to 46 gpm 4. Run Duration—Duration for each varied from 29 to 81 minutes depending on the number of coatings—pre-treat, silicate, post-treat. For example, sample I1 has coatings thickness was not measured. The deposite composition contained, as indicated, sodium silicate with coupling agent above and below the sodium silicate layer(s).

5. Results—Each group was examined and documented with a S.E.M. to verify the coating. Each group exhibited a uniform coating with minimal loss due to agglomeration or deposition on the filter bags. Filter bags are at the top of the machine where the fluidizing gas exits. The bags are used to catch entrained particles which would otherwise be discharged to the environment. However after testing, the "A" fibers performed better. It is suspected that there was not any tramp oil present on the "D" fibers did not have a clean surface on which to deposit the sodium silicate, so the sodium silicate did not stick. Several grams of silicate powers were cleaned from the filter bag. Typical yields were between 94.4 to 94.6%.

6. Secondary Coating—Group H1 received a double coating of silicate (without coupling agent) and were batch dipped in a metal salt namely zinc chloride to insolulize the silicate coating. Thickness was not measured—probably mono di-molecular (20 wt % solution of Fisher Analytical reagent CAS# 7646-85-7 in distilled water.

7. Testing—The G1 group was used to produce test specimens similar to automotive brake pad formulas as well as corrosion testing per ASTM B117.

EXAMPLE 3

The purpose of this example is to illustrate the process of coating carbon fibers, utilizing fluid bed coater granulator (Glatt) technology.

Sample Preparation

1. The bowl was charged with 6.5 kg of carbon fibers
2. The coating containing vessel was charged with 900 g liquid sodium silicate (P.Q. "N" grade) diluted with 75 g of distilled water.

3. Preliminary settings for the Glatt GPCG-5 with a 2.2 liter product bowl were as follows:
   A. Port size 0.8 mm
   B. Filter no. 510–016
   C. Set inlet temperature @ 65° C.
   D. Outlet temperature @ 32° C.
   E. Product temperature 42.5° C.
   F. Outlet flap setting, 38%
   G. Fluid flow rate setting 5 g/min
   H. Air volume 2.0 M/S 4. Run Conditions—Same as above except outlet temperature varied during the by 32° C. to 42° C., product temperature varied from 35° C.–49° C., flow rate averaged 5 g/pm 5. Results—Two groups of carbon fibers were coated namely batch number H1 and I1. After coating each group was examined and documented with a S.E.M. to verify the coating. Batch groups exhibited a uniform coating with minimal loss due to agomeration or deposition on the filter bags. Typical yields were between 94.4 to 94.6%.

EXAMPLE 4

The purpose of this example is to illustrate the process of coating particles, utilizing fluid bed coater granulator (Glatt) technology.

Sample Preparation

1. The bowl was charged with 4.5 kg of 200 mesh sodium silicate particles.
2. The coating containing vessel was charged with 900 g liquid sodium silicate (P.Q. "N" grade) diluted with 75 g of distilled water.
3. Preliminary settings for the Glatt GPCG-5 with a 2.2 liter product bowl were as follows:
   A. Port size 0.8 mm
   B. Filter no. 510–016
   C. Set inlet temperature @ 65° C.
   D. Outlet temperature @ 32° C.
   E. Product temperature 42.5° C.
   F. Outlet flap setting, 38%
   G. Fluid flow rate setting 40 g/min
   H. Air volume 300 CFM
4. Run Conditions—Same as above except outlet temperature varied during the by 37° C. to 42° C., product temperature varied from 41° C.–49° C., flow rate averaged 40 g/pm with a range from 34 to 46 gpm
5. Run Duration—Duration for each varied from 29 to 81 depending on the number of coatings.
6. Results—A specimen was retained, examined and documented with a S.E.M. to verify the coating. The particles exhibited a uniform coating with minimal loss due to agomeration or deposition on the filter bags. Several grams of silicate powers were cleaned from the filter bag
7. Secondary Coating—A portion of the specimen was batch dipped in a metal salt namely zinc chloride to insolulize the silicate coating.

EXAMPLE 5

The purpose of this Example was to demonstrate the effect of treating sodium silicate powder with solutions which are believed to react with the surface of the sodium silicate particles and thereby reducing the solubility of the particles or changing the resultant pH upon dissolution of the particles.

In this example, the factors will be limited to solution type, solution concentration, and treatment time. Each factor was investigated at two levels. The experimental design was an 8 run full factorial design to provide a 6 resolution experiment and provide all main effects and interactions. A ninth run was added as a control run to show the effect of just treating the sodium silicate particles with distilled water. The measured results included the amount of treated sodium silicate particles recovered from the treatment process, the solution pH of the treated sodium silicate particles (after 15 minutes), and the thickness of the treated sodium silicate particle sediment layer in solution after 24 hours. The following table lists the sample characteristics:

| Run # | | Concentration (Wt. %) | Treat Time (Hr) |
|---|---|---|---|
| | Solution Type | | |
| 1 | Zinc Chloride | 5 | 0.5 |
| 2 | Zinc Chloride | 5 | 5 |
| 3 | Zinc Chloride | 20 | 0.5 |
| 4 | Zinc Chloride | 20 | 5 |
| 5 | Ammonium Zirconyl Carbonate | 5 | 0.5 |
| 6 | Ammonium Zirconyl Carbonate | 5 | 5 |
| 7 | Ammonium Zirconyl Carbonate | 20 | 0.5 |
| 8 | Ammonium Zirconyl Carbonate | 20 | 5 |
| 9 | Distilled Water (Control) | 100 | 5 |
| | Material Type | | |
| 1–9 | N Grade Coated Sodium Silicate Particles Treated As Above | | |
| 10 | N Grade Coated Sodium Silicate Particles Coated With Organo Zirconate—Comparison | | |
| 11 | N Grade Coated Sodium Silicate Particles (Untreated)—Control | | |

For purposes of comparison, sodium silicate powder previously treated with 20 mL of a 70 g/L solution of Ken-React NZ-37 (Kenrich Petrochemicals, Inc.) in anhydrous 5 isopropyl alcohol per pound of sodium silicate powder was tested for solubility (Run #10), as well as untreated N Grade coated sodium silicate particles (Run #11). Each run was performed by adding 30 grams of powder to 50 grams of treatment solution. After the treatment time has elapsed for the run, the slurry was filtered through filter paper and the retained solid material was washed with 100 milliliters of deionized water, added 25 milliliters at a time. The filtration was facilitated with the use of a standard water faucet aspirator. The retained material and filter paper was then dried in the oven at 200 F. until dry(approximately 4 hours). The pH response of the resultant material was determined by adding 10 grams of powdered material to 50 milliliters of deionized water and measuring the solution pH every periodically for at least 2 hours or until a steady value was obtained. After 24 hours, the final solution pH was determined and the thickness of the remaining sediment layer measured.

The following sets forth the materials employed in this Example:

Ken-React NZ-37 from Kenrich Petrochemicals, Inc. of Bayonne, N.J. [Zirconium IV bis 2,2(bis-2-propenolatomethyl) butanolato, bis(para amino benzoato-O)]

Zinc Chloride, anhydrous Certified A.C.S. from Fisher Scientific

G Sodium Silicate Powder (PQ Corp./Valley Forge, Pa.)

Coated G Sodium Silicate Powder prepared as described in Example #1.

Bacote 20% solution (Ammonium Zirconyl Carbonate) from Magnesium Elektron (Flemington, N.J.)

Cole Parmer Chemcadet Jr. Model 5982-20 pH Meter

Cole Parmer General Purpose combination Ag/AgCl electrode

Fisherbrand P4 Filter Paper

The following Table lists the results obtained from this Example

| | Treatment Process | | | Treatment Effect | |
|---|---|---|---|---|---|
| Run # | Filtering Problem? | Filtrate pH | Amount** Recovered (g) | pH (15 Minutes) | Sediment Layer (mm) |
| 1 | Yes | 11.00 | 11.52 | 10.95 | 13.5 |
| 2 | Yes | 11.05 | 16.24 | 11.00 | 9.0 |
| 3 | No | 6.95 | 39.43 | 11.15 | 8.5 |
| 4 | No | 8.65 | 42.86 | 11.20 | 8.5 |
| 5 | No | 10.80 | 31.40 | 10.95 | 9.5 |
| 6 | No | 10.90 | 58.88 | 11.00 | 8.0 |
| 7 | Yes | 9.50 | 30.95 | 9.85 | 8.0 |
| 8 | Yes | 9.60 | 30.33 | 9.90 | 9.50 |
| 9 | Yes | 11.40 | 5.19* | 11.10 | 0.0 |
| 10 | N/A | N/A | N/A | 11.50 | 0.0 |
| 11 | N/A | N/A | N/A | 11.50 | 0.0 |

*This weight includes portions of the filter paper which could not readily be separated from the sodium silicate glassy deposit.
**This weight includes water of hydration.

The above results demonstrate that the concentration of the treatment solution used effects the ease of the treatment process as well as the pH behavior of the resultant treated sodium silicate particles. Treatment with both zinc chloride solutions and ammonium zirconyl carbonate solutions both are shown to reduce the solubility of the sodium silicate particles as well as reduce the resultant pH. The pH response did not yield any significant differences for 30 minute treatment times compared to 5 hour treatment times. The pH response of zinc chloride treated sodium silicate particles did not exhibit a significant difference with respect to the treatment solution concentration. However, the pH response of the ammonium zirconyl carbonate did yield a significantly lower pH for the 20 wt % treatment solution as compared to the 5 wt % treatment solution. It is noted that there appeared to be a difference in the structure of the coated particles after treatment with the ammonium zirconyl carbonate solutions. The 20 wt % solutions yielded a more gelatinous filter cake which caused difficulty with the filtering and washing process. In contrast, the filtration difficulties encountered in runs 1 and 2 (5% zinc chloride treatment solutions) are hypothesized to have occurred due to dissolution of the sodium silicate (indicated by the high filtrate pH and poor recovery) which then sealed the pores in the filter paper.

The best results were obtained by treatment with a 20 wt % solution of zinc chloride or a 5 wt % solution of ammonium zirconyl carbonate. Although the control treatment process (Run #9) yielded a similar pH effect after 15 minutes, it was observed that after approximately 4 hours all of the treated sodium silicate from run #9 had dissolved, whereas the sodium silicate particles treated with zinc chloride or ammonium zirconyl carbonate still had undissolved material in the form of a sediment layer after 24 hours.

In comparison, untreated sodium silicate particles as well as sodium silicate particles coated with Ken-React NZ-37 organozirconate material both completely dissolved within 4 hours. It is noted that although the NZ-37 material did not appear to react with the sodium silicate powder or otherwise affect its solubility, it was effective as an anti-clumping or flow control aid. After several years of storage, the coated sodium silicate material (which would normally absorb moisture and begin clumping) had no evidence of clumping.

EXAMPLE 6

This example illustrates a process for coating seeds in a commercially available pan coating systems.

Soybean seeds were coated with N-grade sodium silicate diluted with 10%–20% distilled water. Several grams of the silicate solution were dispensed into a 200 ML straight sided open mouth container. With the container tilted on a slight angle, the soybean seeds were added as the container was rotated at 10–20 R.P.M. with a plastic squeege perpendicular to the base thereby creating a rolling action of the seeds after exiting the silicate pool. Coating thickness was controlled with the addition of silicate solution. A secondary coating was applied in the same manner as previously described wherein the coating medium was ammonium zerconyl carbonate to render the silicate partially and/or completely insoluable.

What is claimed is:

1. A substrate comprising fibers at least partially coated with at least one of silica and a silicate, and a second coating comprising at least one of aluminum chloride, zinc chloride, an organozirconate and ammonium zirconyl carbonate.

2. The substrate of claim 1 wherein the substrate comprises carbon fibers.

3. The substrate of claim 2 further comprising an intermediate layer comprising an effervescent material.

4. The substrate of claim 3 wherein the intermediate layer comprises sodium bicarbonate.

5. A substrate comprising steel fibers wherein at least a portion of the surface of said fibers have a coating comprising a silicate wherein said coating is coated with a second coating comprising at least one of an aluminate, a silane, titanate, zirconate and the second coating is coated with a third coating comprising a silicate.

6. The substrate of claim 5 wherein the second coating comprises a titanate.

7. The substrate of claim 6 wherein the titanate comprises titanium IV 2,2 (bis 2-propanylatomethyl) butanolato-tris(3-amino) phenylato.

8. The substrate of claim 2 wherein the second coating comprises a zirconate.

9. The substrate of claim 8 wherein the zirconate comprises zirconium IV bis 2,2 (bis 2-propenylatomethyl) butanolato, bis(paraaminobenzaoto-O).

10. A substrate comprising steel fibers having a first coating comprising a silane, a second coating comprising a silicate and a third coating comprising a silane.

11. The substrate of claim 5 or 10 wherein the silane comprises at least one member selected from the group consisting of trimethoxysilylpropyl-polyethylenimine and aminoethyl-3-aminiopropyl trimethoxysilane.

12. The substrate of claim 5 or 10 wherein said silicate comprises sodium silicate.

13. A coated fiber made by a method comprising spray drying a coating comprising at least one of silica and a silicate upon said fiber, contacting the coated fiber with at least one member selected from the group consisting of aluminates, silanes, titanates and zironcates.

14. The coated fiber of claim 13 wherein said contacting comprises immersing the coated substrate.

* * * * *